2,927,135

1.4- AND 1.5-CYCLO-OCTANOLONE AND PROCESS OF PREPARING BY OXIDATION OF CYCLOOCTANE

Hans Moell and Otto Schlichting, Ludwigshafen (Rhine), Germany, assignors to Badische Anilin- & Soda-Fabrik Aktiengesellschaft, Ludwigshafen (Rhine), Germany No Drawing. Application November 25, 1957
Serial No. 698,410

Claims priority, application Germany November 28, 1956

4 Claims. (Cl. 260—586)

This invention relates to a process for the production of 1.4- and 1.5-cyclo-octanolone by oxidation of cyclo-octane with molecular oxygen, for example with air, according to which cyclo-octanone and cyclo-octanol are obtained as main products. The invention starts from the process for the production of cyclo-octanone and cyclo-octanol by oxidation of cyclo-octane with molecular oxygen, for example air, if desired in the presence of oxidation catalysts. In this oxidation process, cyclo-octane is oxidized at atmospheric or at moderately increased pressure and at elevated temperature to a reaction mixture which contains in the main cyclo-octanol and cyclo-octanone. When the main products are separated by fractional distillation of the oxidation mixture, which may be carried out for example at reduced pressure, there remains behind a distillation residue from which hitherto merely small amounts of suberic acid and esters of cyclo-octanol could be recovered.

We have now found that the oxidation mixture contains, besides cyclo-octanone, cyclo-octanol and small amounts of suberic acid and the esters of cyclo-octanol, two hitherto unknown keto-alcohols of the cyclo-octane series, namely 1.4- and 1.5-cyclo-octanolone.

The invention relates to a process for the oxidation of cyclo-octane at atmospheric or moderately increased pressure in the liquid phase at elevated temperature, if desired in the presence of oxidation catalysts, with molecular oxygen, according to which, besides the cyclo-octanone and cyclo-octanol mainly formed, there are also recovered 1.4- and 1.5-cyclo-octanolone, by separating in a suitable way from the distillation residues remaining after distilling off the cyclo-octanone and cyclo-octanol, the 1.4- and 1.5-cyclo-octanolone.

The oxidation of the cyclo-octane can be carried out in known manner at atmospheric or moderately increased pressure at 1 to 50 atmospheres, in the liquid phase at temperatures between about 60° and 250° C., especially at temperatures between 80° and 150° C., if desired in the presence of oxidation catalysts. Heavy metal salts such as manganese stearate, cobalt oleate or cobalt naphthenate, i.e. the fatty acid salts of the heavy metals, may be used as catalysts. Other known oxidation catalysts, as for example permanganates, barium cinnamate or peroxides, may also be used. In the oxidation it is preferable to proceed so that about 10 to about 50% of the cyclo-octane is reacted. The oxidation mixture is worked up and the unreacted cyclo-octane preferably is returned to the oxidation stage.

It is preferable to proceed by stirring the residues from the distillation of the oxidation product with water, whereby they dissolve in the aqueous layer. The two compounds can be isolated from the aqueous layer for example by salting out and the resultant mixture of the two isomeric cyclo-octanolones can be separated into its two components by stirring with the same volume of a hydrocarbon fraction boiling up to about 200° C., whereby the 1.5-cyclo-octanolone remains undissolved and the 1.4-cyclo-octanolone is recovered by evaporation of the solvent.

The distillation residue, which is obtained after separating the cyclo-octanone, cyclo-octanol and the unreacted cyclo-octane from the oxidation mixture, contains besides the two isomeric cyclo-octanolones, only very small amounts of suberic acid, for example up to about 1%. In working up the distillation residue, it is stirred for example with one fifth to twenty times the amount by weight, advantageously with half to twice the amount by weight, of water. The water may be at a temperature of 0° to 100° C. It is preferable to stir the residue at a temperature which corresponds to room temperature up to about 60° C. with water. It is advantageous to keep the temperature of the water below 70° C. because in this temperature range it is known that the suberic acid is practically insoluble in water. By working in this way, the aqueous layer which is formed by the treatment with water contains only traces of suberic acid in addition to the two isomeric cyclo-octanolones.

The two isomeric cyclo-octanolones can be separated out from the aqueous layer by the addition of an electrolyte, salts being mainly used. For the salting out there are used, for example, the halides of the alkali and alkaline earth metals, such as sodium or potassium chloride or other salts of strong acids such as sodium sulfate and potassium sulfate. The electrolytes are added to the aqueous layer up to the saturation limit. The separated mixture of the two isomeric cyclo-octanolones can then be separated by the addition of a hydrocarbon, preferably a hydrocarbon fraction boiling up to about 200° C., by stirring the mixture with this hydrocarbon, whereby the 1.4-cyclo-octanolone is dissolved where the 1.5-cyclo-octanolone remains undissolved. As solvents for the separation of the mixture there may be used for example petroleum fractions, such as petroleum ether and, advantageously, ligroin. The hydrocarbons are added in amounts of one fifth to five times the amount by weight of the mixture. The 1.4-cyclo-octanolone can be recovered in a simple way from its solution by evaporation of the hydrocarbon.

The two cyclo-octanolones obtained in this manner are already quite pure. Further purification, however, can be effected by recrystallization or distillation.

The evidence of the constitution of the new compounds can be adduced inter alia by analysis, production of derivatives of the keto and the hydroxyl groups, hydrogenation to the corresponding cyclo-octane-diols and oxidation with nitric acid, whereby from the 1.5-cyclo-octanolone two molecules of succinic acid and from the 1.4-cyclo-octanolone adipic acid are formed besides lower molecular weight products.

The new keto-alcohols of the cyclo-octane series can be used as intermediate products for the production of plastics. For this purpose, the keto-alcohols are converted into the corresponding diols by hydrogenation and the diols are reacted, for example, with adipic acid or suberic acid. The polyesters thus obtained are high-grade products. The hydrogenation can be carried out in a manner conventionally used for the hydrogenation of different keto compounds. It is good practice to work at a temperature of between 150° and 200° C. and a pressure of between 100 and 200 atmospheres and to use Raney nickel as a catalyst. The hydrogenation can also be carried out by the trickling method in continuous operation. In this case, working at a temperature of 220° C. is preferred.

The 1.4- and 1.5-cyclo-octane-diols obtained can be further converted into polyurethanes by reaction with isocyanates.

The following example will further illustrate this invention but the invention is not restricted to this ex-

Example 1,000 parts of the oxidation product prepared by oxidation of cyclo-octane with air at 120° C. in the presence of cobalt naphthenate are distilled under reduced pressure until the cyclo-octanone and the cyclo-octanol have passed over. 50 parts of residue remain behind. This is shaken with 50 parts of water at room temperature. All except about 5 parts of an oil pass into solution.

The aqueous solution carefully freed from oil is then saturated with sodium chloride, whereby the mixture of cyclo-octanolones separates in oily and sometimes in crystalline form. It is freed from water, dried and distilled at reduced pressure, whereby it passes over at 100° to 102° C. at 0.6 mm. Hg. The yield amounts to about 40 parts.

The mixture is stirred at room temperature with 40 parts of ligroin of the boiling range 70° to 150° C. The 1.5-cyclo-octanolone thereby remains undissolved. By recrystallization from ethyl acetate, about 10 parts of pure 1.5-cyclo-octanolone are obtained as colorless crystals of the melting point 99° to 100° C.

By evaporation of the ligroin and distillation of the remaining residue under reduced pressure, 30 to 35 parts of pure 1.4-cyclo-octanolone of the boiling point 100° to 102° C. at 0.4 to 0.5 mm. Hg are obtained. It forms colorless crystals of the melting point 58° to 59° C. The two products may be characterized by the following reaction products:

|  | 1.4-cyclo-octanolone | 1.5-cyclo-octanolone |
| --- | --- | --- |
| oxime | melting point 86° to 87° C. from ethyl acetate. | melting point 141° to 143° C. from water. |
| phenylhydrazone | 90° to 91° C. | melting point 100° to 102° C. from ethanol. |
| urethane | melting point 117° to 119° C. from ethyl acetate. | melting point 103° to 104° C. from ethyl acetate. |
| phenylurethane | 98° to 99° C. | melting point 108° to 109° C. from ethanol. |
| hydrogenation product | boiling point 120° to 121° C. at 1 mm. Hg. OH-number=732 | boiling point 135° to 145° C. at 3 mm. Hg. OH-number=749 |

We claim:
1. Substantially pure 1.4-cyclo-octanolone.
2. Substantially pure 1.5-cyclo-octanolones.
3. A process for the production of 1.4- and 1.5-cyclo-octanolone which comprises oxidizing cyclo-octane in the liquid phase with molecular oxygen at a pressure of 1 to 50 atmospheres and at a temperature of 60 to about 250° C., separating cyclo-octanone, cyclo-octanol, and cyclo-octane from the resultant oxidation mixture by distillation; stirring the remaining distillation residue with water at a temperature of 0 to 100° C.; and thereafter salting out the 1.4- and 1.5-cyclo-octanolone which is dissolved in the formed aqueous layer.
4. A process as claimed in claim 3 wherein the 1.4-cyclo-octanolone is separated from the mixture of the two isomeric cyclo-octanolones by the addition of a solvent having a boiling point up to about 200° C., said solvent being selected from the group consisting of hydrocarbons and hydrocarbon fractions, whereby the 1.5-cyclo-octanolone remains undissolved and the 1.4-cyclo-octanolone is recovered by the evaporation of the solvent.

References Cited in the file of this patent

FOREIGN PATENTS 917,842 Germany _____ Sept. 13, 1954

OTHER REFERENCES

Blomquist et al.: J. Am. Chem. Soc., vol. 75, pp. 2153–4 (1953).